Figure 2:
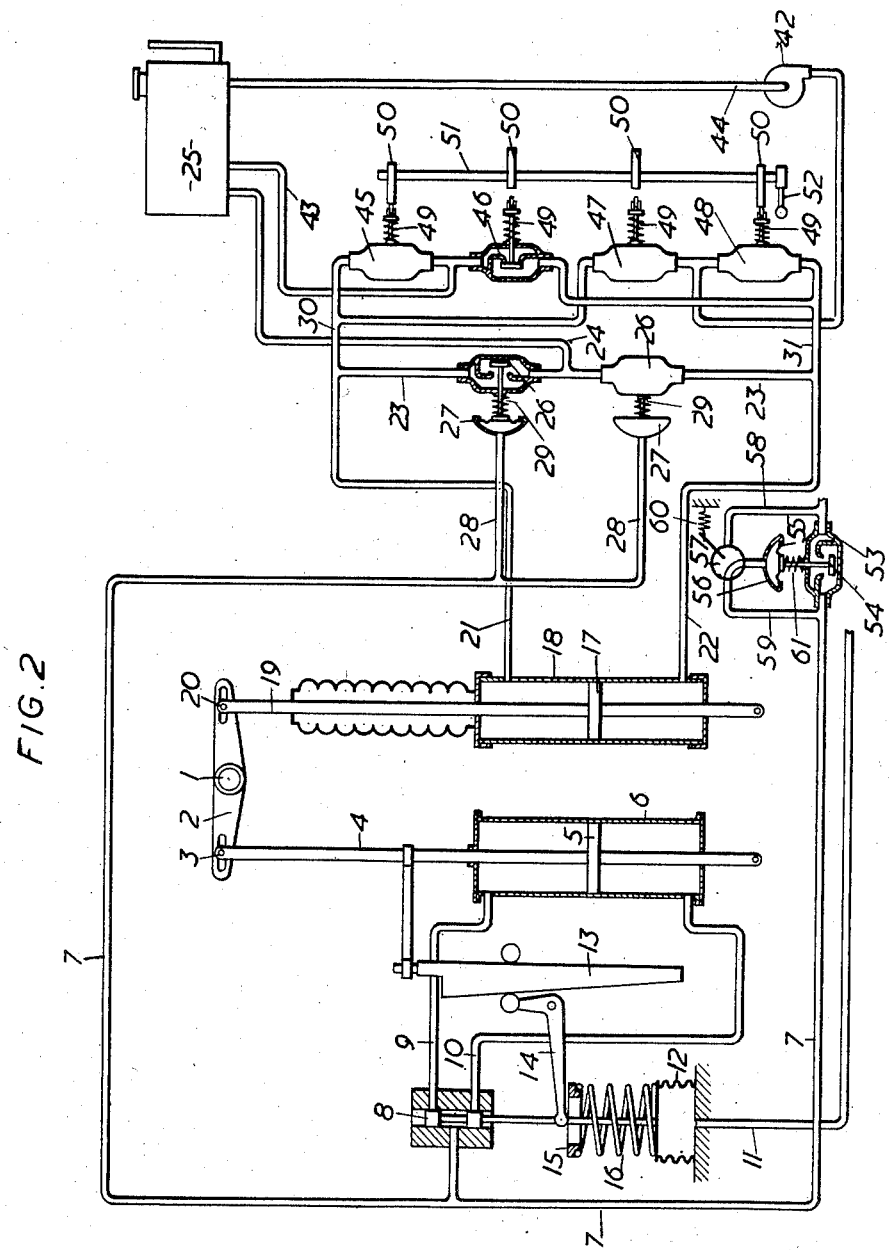

April 29, 1958

J. A. M. GROUT ET AL 2,832,200

CONTROL APPARATUS

Filed Dec. 10, 1954

2 Sheets-Sheet 1

FIG.1.

Inventors:
John Arthur Munford Grout,
Gordon Pelham Cooke
By:
Baldwin & Wight
Attorneys

United States Patent Office 2,832,200
Patented Apr. 29, 1958

2,832,200

CONTROL APPARATUS

John Arthur Munford Grout and Gordon Pelham Cooke, Luton, England, assignors to George Kent Limited, London, England Application December 10, 1954, Serial No. 474,505

9 Claims. (Cl. 60—97)

This invention relates to control apparatus of the kind in which automatic control of a regulator for regulating the value of a controlled condition is effected by pressure change in gas pressure transmitted to a displaceable component to actuate the regulator; the gas which is generally used is air and therefore for convenience reference will be made hereinafter to "pneumatics" or "air."

In certain cases, it is desirable that in the event of failure of the pressure-air supply, the regulator shall remain fixed in the position it occupied at the instant of the failure and shall not tend to move under any reaction to which it is subjected. It is also desirable that the apparatus shall, if the air supply fails, be capable of manual regulation from some convenient position until such time as the pressure-air supply is restored.

The main object of this invention is to provide a control apparatus which will enable these conditions to be obtained and broadly stated the present invention consists in coupling to the displaceable component of the air-operated apparatus a displaceable component in a liquid flow system having valve means by which, in response to failure in the air supply to the air operated apparatus, operates to prevent the flow of liquid and so holds the displaceable components and hence the regulator positively (by liquid reaction) in the setting it had at the time of air failure.

It will be understood that reference to coupling the displacers together is intended to include the coupling together or any two parts respectively in the air-operated or pneumatic apparatus and in the hydraulic apparatus so that movement of one part is accompanied by movement of the other part.

A further feature of the invention consists in providing, in the hydraulic apparatus, means by which, under manual control, liquid flow is permitted to effect displacement of the displaceable component of the hydraulic apparatus and hence to effect operation of the regulator.

In carrying the invention into effect the pneumatic apparatus comprises a displaceable component such as a piston or a diaphragm coupled to the regulator, pressure air being normally applied to the component (either directly or through a relay) under the control of a device which may be manually operated but is more usually controlled automatically in response to the departure of the controlled condition from the desired value. The hydraulic apparatus also comprises a displaceable component arranged to be displaced by hydraulic transmission through a system usually by an hydraulic pump, the hydraulic system having valve means by which the liquid in the system can be prevented from being displaced. The two displacement components, i. e. one in the pneumatic apparatus and the other in the hydraulic apparatus are tied together so that they both move together and the valve means in the hydraulic system is subjected to the action of the pressure-air supply so that it holds the hydraulic system open for free flow of the liquid so long as the pressure-air supply is effective in causing actuation of the regulator: as soon as the air supply falls below the requisite operating pressure (due to a breakdown in the air supply or to unintended cutting-off of the supply) the valve means in the hydraulic apparatus operates to stop the free circulation of the liquid and (since the two displaceable components are tied together) holds the regulator in the position it occupied at the time of failure of the air supply. Provision is preferably also made for effecting, usually under manual control, the displacement of liquid in the hydraulic system in shunt across the valve means referred to so that the hydraulic displaceable component can be operated by hydraulic transmission to move the regulator as required.

The invention is illustrated in two arrangements in the accompanying drawings, in which Figure 1 is a layout in a more or less diagrammatic form of one arrangement and Figure 2 is a similar view of the other arrangement.

In both Figures 1 and 2, 1 indicates the spindle of a regulator, this spindle having on it a lever 2 which is connected by the pivot 3 to the rod 4 of a pressure displaceable element shown as a double-acting piston 5: this piston moves in a cylinder 6 and the piston and cylinder constitute the air-pressure device or motor to effect control operation of the spindle and hence of the regulator which itself can be of any known kind, e. g. a valve or a rheostat.

The supply of pressure air to the cylinder 6 is made through a supply pipe 7 and is controlled by valve 8 which regulates the admission of the pressure air and the discharge of that air from the cylinder at opposite sides of the piston 5, the supply and discharge being effected through pipes 9, 10 connected to the respectively opposite ends of the cylinder 6. The valve 8 itself is operated by air-pressure variation transmitted through a pipe 11 to a diaphragm 12 which is coupled to the valve 8; to re-set the valve 8 as the piston 5 moves in response to an air-pressure transmitted to it, the piston rod 4 has a re-setting cam 13 operating through a follower lever 14 against a component 15 providing a reaction point for a compression spring 16 which acts to oppose displacement of the diaphragm 12 under increase of air pressure transmitted to it through the pipe 11.

The apparatus so far described is already well known and further description is therefore believed to be unnecessary for an appreciation of the present invention which is concerned to make provision for effecting certain operations in the event of failure in the valve operating air supply in the pipes 7 so that valve operation becomes impossible.

An important operation which the invention provides is to lock the regulator (controlled by the spindle 1) in the position it had at the moment of failure in the air supply or at least its reduction below a predetermined value. This is effected by the use of an hydraulic lock which, in the arrangement shown in the drawings, is constituted by a second double-acting piston 17 in a cylinder 18, the rod 19 of the piston being pivoted at 20 to the other end of the lever 2. The swept volume of the cylinder 18 at the two sides of the piston 17 are charged with a liquid, such as oil, through two pipes 21, 22 connected by a pipe 23 to provide a liquid circulation system which is fed through a supply pipe 24 from a supply tank 25.

In the connecting pipe 23 are interposed valves 26 (of which one is shown in section in Figure 2) which are controlled by diaphragm operators 27 to which are taken connections 28 from the air supply line 7: as will be seen from the section of the one valve 26 shown in Figure 2, the valves are biased by springs 29 to their closing positions but are normally held open by the pressure of the air transmitted via the lines 28 to the diaphragms.

In this normal condition (i. e. while pressure-air supply is maintained in the pipe 7) movement of the air operated piston 5 causes movement of the hydraulic piston 17 and, the valves 26 being open, the movement of the hydraulic piston merely causes the liquid to circulate idly through the pipes 21, 22 and 23. So soon, however, as the air supply in the line 7 fails by breakdown in the air supply or by being inadvertently cut off, the holding pressure on the diaphragm operators 27 also fails and the springs 29 shut the valves 26. The liquid circulation line is now closed so that the liquid (being substantially incompressible) holds the piston 17 against displacement and in its turn locks the spindle 1.

Another important operation which the apparatus of this invention provides is the manual control of the spindle 1 while the air control is ineffective. This manual control is arranged by extending the hydraulic pipes 21, 22 in shunt across controlled liquid circulation referred to from points upstream of the valves 26, and by providing an arrangement by which liquid under pressure can be supplied to the pipes 21, 22 to operate the piston 17 and hence the spindle 1 even while the air supply is ineffective, the arrangement reinstituting the hydraulic lock as soon as the application of pressure liquid ceases. The extensions from the pipes 21, 22 are indicated in both Figures 1 and 2 at 30, 31.

In the arrangement shown in Figure 1, the pipes 30, 31 have in each of them a valve, indicated generally at 32. This valve comprises a body 33 having in it a bore in which is mounted a plunger 34 having a land 35 and an end pressure surface 36. This plunger is biased by a spring 37 so that its land closes a passage 38 to which the downstream part of the pipe 30 or 31 is connected. The body also has a passage 39 to which the upstream part of the pipe 30 or 31 is connected, this passage communicating with the passage 38 through a non-return valve 40. In addition, the body 33 for each pipe 30 or 31 has a passage 41 which opens to the end pressure surface 36 and is connected by a pipe 42 to the upstream part of the other pipe 31 or 30 in which the other body 33 is connected.

With this arrangement, an increase of pressure, due to a manual control, transmitted through either pipe 30 or 31 (say the pipe 30) opens the non-return valve 40 to displace the piston 17 in one direction of the body in the pipe 30, however, the liquid displaced by the other side of the piston is permitted to be displaced only when and so long as the operating pressure in the pipe 30 is applied via the pipe 42 to the end pressure surface 36 of the plunger 34 in the body 33 in the other pipe 31, this action resulting in causing the land 35 to open the passage 38 so as to enable the liquid displaced to flow through the pipe 31.

With such an arrangement, therefore, as soon as the pressure in the pipe 30 drops, the plunger 34 appertaining to the other pipe 31 is moved by its spring 37 to close that pipe 31 and the hydraulic lock is at once remade.

Figure 2 illustrates a modified arrangement for achieving the same purpose as that afforded by the automatic valves 32. In this construction of Figure 2, the extension pipes 30, 31 which by-pass the air-operated valves 26 are arranged to be connected in a pressure-liquid circulation comprising a pump 42, the tank 25 and flow pipes 43, 44. Control is effected by four valves 45, 46, 47, and 48 of which only the valve 46 is shown in section: as will be seen from that section, the valves are biased by springs 49 to their closing positions and they are arranged to be opened by cams 50 on a cam shaft 51.

The cam shaft is arranged to be manually operated by a handle 52 and the sequence of operations effected by turning the shaft is as follows: in the normal position all the valves are closed so that the extension pipes 30, 31 are shut off and the hydraulic lock on the piston 17 is effective in the event of failure in the air supply: if now such a failure has occurred and it is desired to make a manual adjustment of the piston 17 and hence of the regulator, the shaft 51 is turned to a position in which cams 50 open the valves 45 and 48 so connecting the pipes 30 and 31 respectively to the upstream and downstream or the high and low pressure sides of the pump 42; the piston 17 is now allowed to be moved in one direction. To move the piston 17 in the other direction, the cam shaft 51 is turned to cause cams 50 to shut the valves 45 and 48 and to open the valves 46 and 47: the pipes 30, 31 are now reversed, i. e. they are connected respectively to the downstream and upstream sides of the pump 42 and the piston 17 is now caused to be moved in the other direction.

The hydraulic lock of the piston 17 and hence of the spindle 1 is restored by moving the cam shaft 51 to its original position.

As is shown in Figure 2, it is preferred to interpose in the air-supply line 7 a valve 53 which is automatically operated to be closed quickly as soon as the air supply fails. For this purpose, the movable part 54 of the valve (which is biased to its closing position by a spring 61) is linked to a diaphragm 55 in a diaphragm chamber 56 connected via a three-way valve 57 and branches 58, 59 to the air supply pipe 7 upstream and downstream of the valve 53.

The valve is biased by a spring 60 to a position in which it opens the diaphragm chamber 56 to the downstream connection 59 and isolates it from the upstream connection 58.

With this arrangement the valve 54 is normally held open by the air pressure acting on the diaphragm 55 through the downstream connection 59. When the air supply fails or falls below a certain value, the downstream pressure acting on the diaphragm begins to fall which in turn allows the valve to commence to close by its spring 61: this further reduces the downstream air pressure and in turn reduces the pressure acting on the diaphragm 55 the whole resulting in a very rapid closing of the valve. The re-opening of the valve can be effected only when the air supply is again available, at which time by operating the valve 57 against the action of the spring 60, the diaphragm chamber 56 is opened to the now available upstream pressure, the diaphragm 55 is displaced and the valve 54 there-by opened. The valve 57 can now be released, the spring 60 returning it to the position in which it connects the downstream connection to the diaphragm chamber, the now available downstream pressure holding the valve open.

As the air valve 54 requires to be re-set by hand after a failure in the air supply, the operator has control at the time when the plant shall be allowed to revert to full automatic control: this enables the operator to judge the time so as to suit the plant best in the circumstances.

We claim:

1. A control apparatus comprising a pneumatic motor having a pressure displaceable element, a hydraulic motor having a displaceable element coupled with said pressure displaceable element of said motor and with a device to be regulated, a control device for said hydraulic motor operative for preventing flow of hydraulic fluid therefrom, said control device being connected to be maintained inoperative during normal supply of air to said pneumatic motor and to become operative upon a failure in air pressure, and means for overruling said control device to subject said hydraulic motor to control independently of said control device to operate the device to be regulated.

2. A control apparatus comprising a pneumatic motor having a pressure displaceable element, a hydraulic motor having a pressure displaceable element coupled with said pressure displaceable element of said motor and with a device to be regulated, a control device for said hydraulic motor operative for preventing flow of hydraulic fluid therefrom, said control device being connected to be maintained inoperative during normal supply of air to said pneumatic motor and to become operative upon a failure in air pressure, and manually controlled means comprising valve mechanism for controlling the admission of hydraulic fluid to said hydraulic motor independently of said control device to operate the device to be regulated.

3. Control apparatus comprising a double-acting pneumatic motor having a pressure responsive element therein, a hydraulic motor hvaing a displaceable element therein coupled with said pressure responsive element and with a regulating device, an air line, means for controlling the admission of air from said line to the respective ends of said pneumatic motor in accordance with pressure variations in said line to operate said regulating device, control valve means normally providing communication between the ends of said hydraulic motor to allow free movement of said displaceable element, means subject to control upon a predetermined drop in pressure in said air line for closing said control valve means to block flow of hydraulic fluid between the ends of said hydraulic motor to lock said regulating device, and manually controllable means connected to a source of hydraulic fluid and to said hydraulic motor and operative for overruling said control valve means to provide for manually controlled movement of said displaceable element.

4. Control apparatus comprising a double-acting pneumatic motor having a pressure responsive element therein, a hydraulic motor having a displaceable element therein coupled with said pressure responsive element and with a regulating device, an air line, means for controlling the admission of air from said line to the respective ends of said pneumatic motor in accordance with pressure variations in said line to operate said regulating device, control valve means normally providing communication between the ends of said hydraulic motor to allow free movement of said displaceable element, means subject to control upon a predetermined drop in pressure in said air line for closing said control valve means to block flow of hydraulic fluid between the ends of said hydraulic motor to lock said regulating device, and auxiliary control means including ducts connected between a source of hydraulic fluid and the ends of said hydraulic motor independently of said control valve means for bypassing the latter and rendering it ineffective for controlling said hydraulic motor whereby the latter is subject to control independently of said control valve means to operate said regulating device.

5. Apparatus according to claim 4 wherein said ducts are provided with flow control valves, and manually operable means for controlling said flow control valves for the selective admission of hydraulic fluid to either end of said hydraulic motor and the exhaustion of hydraulic fluid from the other end of such motor to operate said regulating device.

6. Apparatus according to claim 4 wherein each duct has a flow control valve device comprising a nonreturn valve allowing liquid to pass to one end of said hydraulic motor, each flow control valve device comprising also a reverse flow passage controlled by a valve element which is biased to closed position, said valve element being subjected to and displaced to its open position by liquid pressure in the duct leading to the other side of said hydraulic motor.

7. Apparatus according to claim 4 wherein said ducts are connected across a hydraulic supply leading to the ends of said hydraulic motor, said ducts being provided with a series of control valves selectively operative to close both ducts or to connect one duct to said source of hydraulic fluid and the other duct to exhaust.

8. Apparatus according to claim 4 wherein said ducts are connected across a hydraulic supply leading to the ends of said hydraulic motor, said ducts being provided with a series of control valves selectively operative to close both ducts or to connect one duct to said source of hydraulic fluid and the other duct to exhaust, and manually operable cam means for selectively operating said series of control valves.

9. Control apparatus comprising a double-acting pneumatic motor having a pressure responsive element therein, a hydraulic motor having a displaceable element therein coupled with said pressure responsive element and with a regulating device, an air line, means for controlling the admission of air from said line to the respective ends of said pneumatic motor in accordance with pressure variations in said line to operate said regulating device, control valve means normally providing communication between the ends of said hydraulic motor to allow free movement of said displaceable element, means subject to control upon a predetermined drop in pressure in said air line for closing said control valve means to block flow of hydraulic fluid between the ends of said hydraulic motor to lock said regulating device, auxiliary control means including ducts connected between a source of hydraulic fluid and the ends of said hydraulic motor independently of said control valve means for bypassing the latter and rendering it ineffective for controlling said hydraulic motor whereby the latter is subject to control independently of said control valve means to operate said regulating device, a shut-off valve in said air line biased to closed position, a pressure responsive element connected to said shut-off valve, a second line connected at its ends to said air line around said shut-off valve, and a manually controllable valve in said second line and operable for subjecting said last-named pressure responsive element either to the upstream or downstream end of said air line relative to said shut-off valve.

References Cited in the file of this patent

UNITED STATES PATENTS

| | | |
|---|---|---|
| 250,103 | Reynolds | Nov. 29, 1881 |
| 2,339,024 | Markson | Jan. 11, 1944 |
| 2,339,469 | Emanuel | Jan. 18, 1944 |
| 2,470,415 | Seborg | May 17, 1949 |
| 2,503,956 | Lisle et al. | Apr. 11, 1950 |
| 2,616,264 | Grant et al. | Nov. 4, 1952 |
| 2,623,502 | Lisle | Dec. 30, 1952 |
| 2,721,447 | Hancock | Oct. 25, 1955 |